UNITED STATES PATENT OFFICE.

JOHN H. ROBERTS, OF CHICAGO, ILLINOIS, ASSIGNOR, BY MESNE ASSIGNMENTS, TO ZALMON G. SIMMONS, OF KENOSHA, WISCONSIN, ANDREW W. PRESTON, OF SWAMPSCOTT, MASSACHUSETTS, AND BRADLEY W. PALMER, OF BOSTON, MASSACHUSETTS, TRUSTEES.

METHOD OF TREATING SUGAR-CANE.

1,040,562.  Specification of Letters Patent.  Patented Oct. 8, 1912.

No Drawing.  Application filed November 24, 1911. Serial No. 662,127.

*To all whom it may concern:*

Be it known that I, JOHN H. ROBERTS, a citizen of the United States, residing at Chicago, in the county of Cook and State of Illinois, have invented certain new and useful Improvements in Methods of Treating Sugar-Cane, of which the following is a specification.

This invention relates to methods of treating sugar-cane, the principal object of the invention being the rapid and economical conversion of sugar-cane, with elimination of water, into a condition of chemical stability, that is to say, into a state in which it will endure prolonged storage or transportation without material loss of its sugar content, being in this state well adapted for the recovery of merchantable sugar and other products.

My preferred procedure is as follows: Sugar-cane, either freshly cut or in substantially the same condition as when freshly cut, is disintegrated in such manner that the woody or fibrous and the pithy constituents are structurally dissociated from each other, the pith being largely converted into a granular condition somewhat resembling wet sawdust, and the woody or fibrous portions into relatively fine shreds, which may vary in length from a fraction of an inch to a foot or more, and which bear a general resemblance to excelsior. The shredding is preferably so conducted that the plant juices, in so far as they may be extruded, are completely re-absorbed in the mass. Instead of shredding the cane in the manner above described, it may be subdivided in any other suitable way. The subdivided cane, containing the normal plant juices, is then charged directly into a drier, which preferably comprises an inclined revoluble cylinder having internal flights or lifting devices. Highly heated gases, usually combustion gases, are caused to flow through the cylinder in direct contact with the shredded cane, which is repeatedly lifted and dropped through the current of gas. Under these conditions fresh surfaces of the moist material are continuously exposed to the drying action of the gases, and the elimination of moisture is extremely rapid. So long as each particle of the mass contains a considerable percentage of moisture, say in excess of six per cent., it is found to be entirely uninjured for sugar-making purposes even when the temperature of the drying gas is in excess of that at which sugar undergoes caramelization; and when the moisture content of the material is sufficiently high, it may be exposed directly to gases having a temperature in excess of 1000° F. without any injury whatever. The conditions of operation are such that the portions of the mass which are not otherwise removed progress regularly through the rotary drum and are continuously discharged therefrom. In order to minimize the danger of injury to the material it is preferred to conduct the drying in at least two more or less distinct stages. In the first stage the moisture content may be reduced to twenty-five per cent. or lower in a rotary drum in direct contact with highly heated combustion gases, the moisture content being thereafter further reduced in a drier of the same or other suitable type under the action of gases at a lower temperature, as for example by a current of air heated by passage in contact with a bank of pipes carrying exhaust or live steam. By proceeding in this manner the moisture may be reduced to any desired minimum while retaining the advantages of the rapid initial removal of moisture by high temperature gases above described.

I have successfully employed a drier of the general type described in United States Patent 545,120 to Cummer.

As above stated, it is desirable that the subdivided cane issuing from the drying system should still contain a certain proportion of moisture, say from two to fifteen per cent., and preferably from six to ten per cent. This residual moisture not only safeguards the sugar content of the cane in the manner above described, but by lessening the resilience of the mass, renders it possible to obtain firmer and denser bales in presses of standard type. In some cases it is found advantageous to permit the mass to cool before baling, this cooling being accompanied by some re-absorption of moisture in case the original moisture content has been greatly reduced.

In order to avoid injury to the sugar content of the cane or to the fibers it is essential that no portion of the disintegrated cane, and in particular none of the sugar-bearing pith cells, should be completely desiccated while in contact with high temperature gases; for in the absence of a material proportion of moisture the sugar would be injuriously affected. I have discovered that all injury, even to the lightest and most minute particles of tissue or to the sugar associated therewith, may be avoided by so controlling the gas current as to its temperature and velocity that the lighter portions of the material are blown and transported from the drier before they are completely dried, and as fast as they approach and before they reach a condition, as regards their moisture content, in which they would be injured by overheating at the temperatures existing in the apparatus. Such transported portions are recovered in a dust chamber or other suitable device, and either separately collected, or, if desired, returned to the cooler portion of the drying apparatus or to the material issuing therefrom. This procedure not only avoids injury to the sugar-bearing material, but in case the transported portions are not returned to the drier or to the material issuing from it, it results in a direct concentration of the fibrous portions of the tissue, so that the product issuing from the drier contains a proportion of fibrous material to pithy matter which is higher than normal. This separation or concentration of the fibrous and pithy constituents may be accentuated by increasing the velocity of the gas flow, and may be supplemented by a further concentration, by screening or otherwise, at any suitable stage of the process.

It is to be understood that the temperature and velocity of the gas current are adjusted not only with reference to the removal of the lighter materials before they have been injured by overheating, but with equal reference to the condition of the heavier portions, which should issue from the drier containing a substantial proportion of moisture, adequate for their protection under existing temperature conditions. By increasing the velocity of the gas, the drying effect upon all classes of the material is accentuated, while at the same time the proportion of the lighter material transported is also increased, so that this lighter material is withdrawn from the heated zone before the moisture therein is reduced to the danger point.

I regulate the velocity of the gas current under substantially constant temperature conditions by a thermostatic control of the ratio between the air admitted to the furnace for purposes of combustion and the air admitted to the combustion chamber for admixture with the combustion gases, fuel adequate for the increased combustion being supplied, preferably by an automatic stoker, or other fuel-feeding device likewise controlled by the thermostat.

The shredded cane having been brought to a condition of chemical stability, and if desired more or less completely separated into fractions which are richer respectively in the fibrous and pithy tissues, with their associated sugar, may now be baled for storage or transport. Preferably, but not necessarily, the fibrous and pithy concentrates are separately baled. The baling may be effected in any suitable device, or even in an ordinary hay press. It is desirable to consolidate the material to a density in excess of forty pounds and preferably approximating sixty pounds per cubic foot, in which state it is practically impervious to the air or atmospheric moisture and in all parts except the outer layer is chemically stable even under highly adverse conditions.

I claim:—

1. The method of simultaneously drying sugar-cane and concentrating the structural portions thereof, which consists in subdividing the cane in such manner as to dissociate the fibrous and pithy portions, drying the material in a current of heated gas having sufficient velocity to transport the lighter portions, and separately collecting said lighter portions.

2. The method of treating sugar-cane, which consists in subdividing the cane, drying the subdivided cane in a current of gas having sufficient velocity to transport the lighter portions thereof, and thereafter effecting a further concentration of the fibrous and pithy portions of the cane.

3. The method of simultaneously drying sugar-cane and concentrating the structural portions thereof, which consists in subdividing the cane in such manner as to dissociate the fibrous and pithy portions, drying the material in a current of heated gas having sufficient velocity to transport the lighter portions, separately collecting said lighter portions, and thereafter further concentrating the fibrous portion of the cane.

4. The method of treating sugar-cane, which consists in shredding the cane under conditions to dissociate the bulk of the pith from the fibrous material, then subjecting the commingled mass to a tumbling operation in a current of heated gas having velocity sufficient to transport the lighter portions.

5. The method of treating sugar-cane, which consists in subdividing the cane, drying the material in a current of heated gas and controlling the gas current to remove the smaller particles from the drying chamber by the said current while they yet contain sufficient moisture to protect the sugar contents thereof.

6. The method of drying subdivided sugar-cane by highly heated gases, which consists in tumbling the material progressively through a drying chamber in a current of heated gas, the velocity and volume of gas flow being regulated and maintained sufficient to blow out and transport to safety, while still safely-moist, practically all those portions which closely approach a dangerously dry condition before they have progressed to a zone of safety under the tumbling action.

7. The method of drying subdivided sugar-cane by highly heated gases, which consists in tumbling the material progressively through a drying chamber in a current of heated gas, the velocity and volume of gas flow being regulated and maintained sufficient to blow out and transport to safety, while still safely-moist, practically all those portions which closely approach a dangerously dry condition before they have progressed to a zone of safety under the tumbling action, both the blown-out and tumbled material being delivered while still containing a sufficient percentage of moisture to protect the sugar contents thereof.

8. The improved method of drying sugar-cane divided into fragments of varying size, which consists in tumbling the material more or less constantly in a blast of gas of a temperature far above that in which the material could be fully dried without injury, and so regulating the velocity and controlling said blast as to blow out of the zone of dangerously high temperature, while still safely-moist and uninjured, such fragments as remain in the blast and are approaching a dangerously dry state.

9. The process of drying sugar-cane subdivided into fragments of varying size, which consists in subjecting the material to agitation and to a blast of highly heated gas in a drying chamber, utilizing the change in specific gravity of the more rapidly drying fragments to effect their separation and removal from the highly heated zone while still safely-moist and in advance of the removal of the less dry fragments, removing the remaining material from the highly heated zone while still safely-moist, and completing the drying of both fractions under lesser and safe temperatures.

JOHN H. ROBERTS.

Witnesses:
HECTOR M. HOLMES,
ANNA E. McCORMICK.